UNITED STATES PATENT OFFICE.

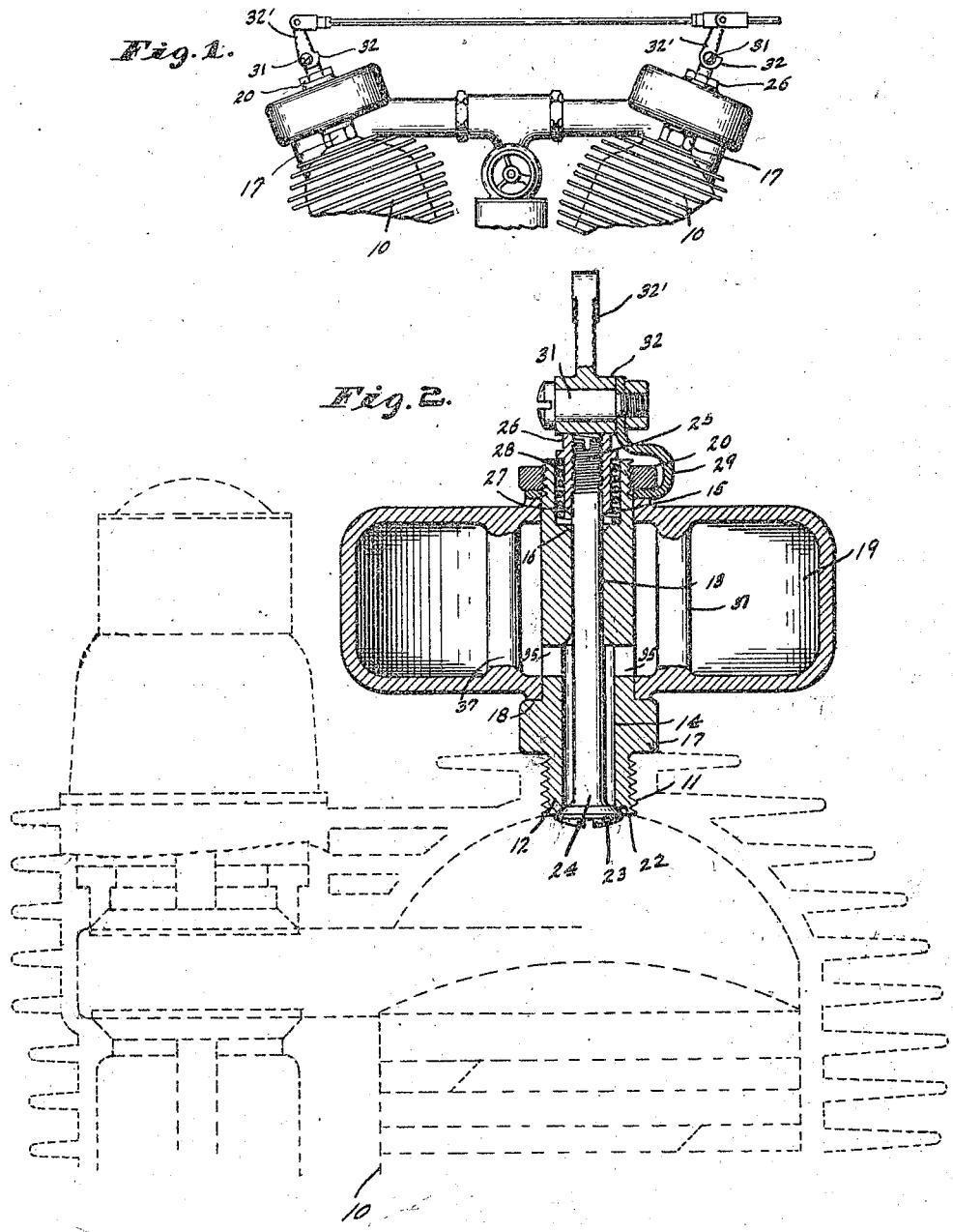

DALMAR T. BROWNLEE, FRED W. SPACKE, AND JOHN D. LOWE, OF INDIANAPOLIS, INDIANA, ASSIGNORS TO THE F. W. SPACKE MACHINE COMPANY, OF INDIANAPOLIS, INDIANA, A CORPORATION OF INDIANA.

COMPRESSION-SPACE ANNEX FOR INTERNAL-COMBUSTION ENGINES.

1,134,967.                Specification of Letters Patent.          Patented Apr. 6, 1915.

Application filed January 28, 1914. Serial No. 815,024.

*To all whom it may concern:*

Be it known that we, DALMAR T. BROWNLEE, FRED W. SPACKE, and JOHN D. LOWE, citizens of the United States, residing at Indianapolis, in the county of Marion and State of Indiana, have invented a new and useful Compression-Space Annex for Internal-Combustion Engines, of which the following is a specification.
In many types of internal combustion engines, especially those which are used in motor cycles, the compression is very high and difficulty is therefore experienced in starting such motors. Many operators attempt to avoid this difficulty by opening the exhaust valves and spinning the motor very fast until there is momentum enough in the fly wheel to carry the motor over its high compression stroke. This operation, however, is one which requires considerable skill and strength.

The object of our present invention is to avoid the difficulties outlined above by providing an internal combustion engine with an additional compression space which may be connected with or disconnected from the combustion chamber so that, when connected with the combustion chamber, the degree of compression while materially lessened, nevertheless remains sufficient to make possible, without expenditure of great force, the ignition of the preliminary charges.

The accompanying drawings illustrate our invention.
Figure 1 is a fragmentary side elevation of a two-cylinder engine equipped with our improvement; Fig. 2 an axial section of our attachment about full-size, a portion of the engine cylinder being shown in dotted lines.
In the drawings, 10 indicates the engine cylinder provided with a threaded opening 11. Threaded into this opening is the lower end of a tubular stem 12 having an axial bore 13 which is enlarged at its lower end at 14 and enlarged at its upper end at 15, the bottom of the enlargement 15 being preferably formed into a valve seat 16. Externally the stem 12 is provided with a polygonal portion 17 by means of which it may be driven to place in the cylinder head and the upper face of this portion 17 forms a seat 18 for the reception of the annex compression chamber 19 which is sleeved upon stem 12 and held in place by a clamping nut
20. The lower end of bore 14, which projects into the combustion chamber of the engine is formed into a valve seat 22 upon which normally rests an inwardly opening valve 23. The stem 24 of valve 23 is projected up through bore 13 and at its upper end is threaded at 25 to receive an adjustable head 26 which at its lower end may be formed with a valve 27 adapted to seat in the seat 16. Arranged in the bore 15 is a compression spring 28 which engages the head 26 and serves to normally hold valve 23 to its seat. Clamped beneath nut 20 is a supporting arm 29 which carries a pivot pin 31 which lies over and at right angles to the stem 24 of valve 23. Pivoted upon pin 31 is a cam 32 which is adapted to engage head 26 so as to drive valve 23 away from its seat. The arm 29 is preferably formed as shown in order that it may have some resilience in the line of the valve stem 23 so that any forces exerted upon the head of valve 23 tending to drive the same suddenly toward its seat will not break the support of cam 32. The upper end of bore 14 communicates through openings 35 with the interior of chamber 19 and the fit of stem 24 in bore 13, while close enough to properly guide the stem, is loose enough to permit gradual leakage from the interior of the chamber. Chamber 19 must of course be of sufficient strength to withstand the possible explosion which may occur therein and for that reason we consider it advisable to tie the upper and lower walls together by spaced posts 37.

In operation, chamber 19 is normally disconnected from the explosion chamber of the cylinder 10 but when it is desired to start the engine the operator, by swinging lever 32' of cam 32, opens valve 23 and thus adds chamber 19 to the compression space of the engine so that, on the compression stroke, the live gases are driven back into chamber 19 and the total compression is reduced by the proportion which the volume of chamber 19 bears to the normal volume of the compression space of the cylinder. As soon as the engine has started under its own power, cam 32 is withdrawn and valve 23 returns to its seat, thus reëstablishing normal compression space of the engine. If valve 27 is provided it will seat in seat 16 during the time the valve 23 is open and thus stop all leakage from chamber 10. This valve 27 however is not essential. When valve 23 has been closed, after compression has taken place in chamber 19, there will be gradual leakage through bore 17 around stem 24, and, before another starting operation is required, the pressure within chamber 19 will have become reduced to atmospheric pressure.

We claim as our invention:

1. As an article of manufacture, a compression-space annex for internal combustion engines comprising a threaded stem having a valve seat formed at its lower end, a valve movably mounted in said stem and normally seated in said valve seat, a compression chamber carried by said stem and communicating with the bore thereof, a spring for normally holding said valve to its seat, and a cam arranged to operate upon said valve to open the same.

2. As an article of manufacture, a compression-space annex for internal combustion engines comprising a threaded stem having a valve seat formed at its lower end, a valve movably mounted in said stem and normally seated in said valve seat, a compression chamber carried by said stem and communicating with the bore thereof, a spring for normally holding said valve to its seat, a cam arranged to operate upon said valve to open the same, and a support for said cam resilent in the line of movement of the valve.

3. As an article of manufacture, a compression-space annex for internal combustion engines comprising a main stem threaded at one end for attachment to an internal combustion engine and threaded at the other end for the reception of a clamping member and having a longitudinal bore provided with a valve seat at one end and opening laterally to an intermediate portion of the circumference of the stem, a valve associated with said valve seat and having its stem projected longitudinally through the main stem, a chamber sleeved upon the main stem and covering the said lateral opening, a clamping member attached to the main stem and holding said chamber in place, and a member associated with said parts by which the valve may be shifted inwardly from its seat.

4. As an article of manufacture, a compression-space annex for internal combustion engines comprising a threaded stem having a valve seat formed at its lower end, a valve movably mounted in said stem and normally seated in said valve seat, a compression chamber carried by said stem and communicating with the bore thereof, a cam arranged to operate upon said valve to open the same, and a support for said cam resilient in the line of movement of the valve.

5. As an article of manufacture, a compression-space annex for internal combustion engines comprising a main stem threaded at one end for attachment to an engine cylinder and having a longitudinal bore laterally extended through the main stem at an intermediate point in its length, said bore being formed into a valve seat at its attaching end, a valve associated with said valve and having its stem extended through the longitudinal bore, and a chamber removably mounted upon said stem and covering the said lateral opening.

In witness whereof, we have hereunto set our hands at Indianapolis, Indiana, this twenty-sixth day of January, A. D. one thousand nine hundred and fourteen.

DALMAR T. BROWNLEE.
FRED W. SPACKE.
JOHN D. LOWE.

Witnesses:
F. S. LAWRIE,
H. A. CUIRE.